United States Patent 	(10) Patent No.: 	US 8,566,293 B2
Strassner et al. 	(45) Date of Patent: 	Oct. 22, 2013

(54) APPARATUS AND METHOD FOR CREATING AND MANAGING PERSONALIZED SERVICES IN COMMUNICATION SYSTEM

(75) Inventors: John Charles Strassner, Pohang-shi (KR); James Won Ki Hong, Pohang-shi (KR)

(73) Assignee: Postech Academy-Industry Foundation, Pohang-shi, Kungsangbuk-do (KR)

( * ) Notice: Subject to any disclaimer, the term of this patent is extended or adjusted under 35 U.S.C. 154(b) by 479 days.

(21) Appl. No.: 12/878,244

(22) Filed: Sep. 9, 2010

(65) Prior Publication Data

US 2011/0137877 A1 Jun. 9, 2011

(30) Foreign Application Priority Data

Dec. 8, 2009 (KR) ......................... 10-2009-0121119
Apr. 12, 2010 (KR) ......................... 10-2010-0033286

(51) Int. Cl.
G06F 17/30 (2006.01)

(52) U.S. Cl.
USPC ........................................................ 707/694

(58) Field of Classification Search
USPC ........................................................ 707/694
See application file for complete search history.

(56) References Cited

U.S. PATENT DOCUMENTS 6,393,471 B1 * 5/2002 Kobata ........................... 709/221
6,519,571 B1 * 2/2003 Guheen et al. ............ 705/14.66
7,392,546 B2 6/2008 Patrick
7,516,045 B2 * 4/2009 Butler ........................... 702/183
7,631,346 B2 12/2009 Hinton et al.
8,230,461 B1 * 7/2012 Ledermann et al. ........... 725/46
2004/0137416 A1 * 7/2004 Ma et al. ........................ 434/365
2006/0069749 A1 * 3/2006 Herz et al. ..................... 709/219
2008/0189295 A1 * 8/2008 Khedouri et al. .............. 707/10
2008/0306872 A1 * 12/2008 Felsher ............................ 705/51
2009/0287837 A1 * 11/2009 Felsher ........................... 709/229
2010/0121936 A1 * 5/2010 Liu et al. ....................... 709/217

FOREIGN PATENT DOCUMENTS

| JP | 2004-533075 A | 10/2004 |
| JP | 2008-104190 A | 5/2008 |
| JP | 2008-108203 A | 5/2008 |
| JP | 2008-171235 A | 7/2008 |
| JP | 2009-032052 A | 2/2009 |
| JP | 2009-217373 A | 9/2009 |
| WO | WO2006114810 | 11/2006 |

\* cited by examiner

Primary Examiner — John E Breene
Assistant Examiner — Joshua Bullock
(74) Attorney, Agent, or Firm — Bacon & Thomas, PLLC

(57) ABSTRACT

An apparatus for creating and managing personalized services includes: a pre-processing unit for converting vendor- and device-specific sensor data into a normalized form; an analysis unit for determining a current state of entities being managed based on the normalized sensor data to thereby determine whether current services and/or resources that have been allocated to a user are being satisfied or not; and a personalization unit for examining state-related context data to determine what action to take. The personalization of the services and/or resources provided to a user or set of users is managed by context-sensitive policy rules. In addition, a set of abstractions, in the form of preferences, profiles, and subscriptions, are collectively used to determine the set of services and/or resources, as a function of context, that a user or set of users are entitled to receive.

19 Claims, 14 Drawing Sheets

APPARATUS AND METHOD FOR CREATING AND MANAGING PERSONALIZED SERVICES IN COMMUNICATION SYSTEM

CROSS-REFERENCE(S) TO RELATED APPLICATION(S)

The present invention claims priority of Korean Patent Applications No. 10-2009-0121119, filed on Dec. 8, 2009, and No. 10-2010-0033286, filed on Apr. 12, 2010, which are incorporated herein by reference.

FIELD OF THE INVENTION

The present invention relates to the fields of personalized services for users and groups of users and, more particularly, to an apparatus and method for creating and managing personalized services in a communication system by realizing a policy-based, context-aware, preferences and profile model for communication devices.

BACKGROUND OF THE INVENTION

As prior art of the present invention, there are several examples of separate, and thus not integrated, profile, preference, and capability models.

Profile Model

In general, a "profile" is defined as a single entity that stores details of users, their preferences, and other information that can be used to deliver a user experience tailored to their individual requirements. Two examples of this approach are the Composite Capabilities Preferences Profile (CC/PP) defined by the W3C, and the User Agent Profile (UAProf) defined by the WAP Forum. UAProf is a specific vocabulary based on CC/PP. CC/PP is expressed using the Resource Description Framework (RDF), and describes the capabilities of a device and preferences of a user. This combination is used to guide the adaptation of content presented to a device.

The 3rd Generation Partnership Project (3GPP) has defined a Generic User Profile (GUP), which standardizes the collection of user-related data; this affects the way in which an individual user experiences services. This specification contains many types of information, including: data describing which services the user has subscribed to, data describing which services the user is authorized to subscribe to, generic user data, such as settings (e.g., name and phone number) and preferences (e.g., language), public land mobile network settings, including preferred access technologies and GPRS settings, privacy settings for different services, service-specific information of the user, such as authentication mechanisms and credentials, terminal-specific data, and billing-related data.

Preference Model

Also, "preferences" are defined as a set of attributes that indicate choices that need to be made on behalf of the user. There are a number of preference models defined, including CC/PP, and the Platform for Privacy Preferences Project (P3P). The P3P is a protocol that enables entities "to declare their intended use of information they collect" about their users through the use of "privacy policies". When a user decides to interact with the entity, the user defines their own set of policies and state what personal information they will allow to be seen by the entities that they interact with. P3P then compares the policies and enables the user to decide what action to take if the policy handling procedures don't agree.

Capability Model

In addition to the CC/PP work defined above, Butler defined a concept called "capability" classes, where each class is associated with a set of constraints. An example of this is the U.S. Pat. No. 7,516,045 B2, "Method of providing content to a target device in a network". This patent describes a method that enables a server to determine how best to supply content to a particular device. This is done by evaluating a set of constraints to determine if the target device belongs to one or more of the capability classes.

However, these prior arts do not offer any viable solutions for providing context-aware personalized services that can be controlled using policy management techniques. Specifically, the prior art has the following important limitations: an inability to change the configuration of affected devices to take into account changing user needs, business goals, and environmental conditions; an inability to adjust the configuration of affected devices to account for the varying relevance of contextual data; an inability to orchestrate the behavior of the system to achieve a particular set of behaviors to match the needs of the user; an inability to relate a set of constraints (e.g., limitations defined by the business, or arising due to the context of the services) to the set of services desired; and an inability to federate services and resources from different domains to meet the needs of different users.

SUMMARY OF THE INVENTION

In view of the above, the present invention provides a an apparatus and method for creating and managing personalized services in a communication system by realizing a policy-based, context-aware, preferences and profile model which enables different representations of data to describe capabilities of a device, needs of a user, and services that are desired.

Further, the present invention provides an apparatus and method for creating and managing personalized services in a communication system by realizing a policy-based, context-aware, preferences and profile model which enables changing contextual needs to be translated into a form that can be used to reconfigure the resources and services being provided.

In accordance with a first aspect of the present invention, there is provided an apparatus for creating and managing personalized services in a communication system, including:

a pre-processing unit for converting vendor- and device-specific sensor data into a normalized form to produce normalized sensor data;

an analysis unit for determining a current state of entities being managed based on the normalized sensor data and producing state-related context data to thereby determine whether current services and/or resources that have been allocated to a user are being satisfied or not; and a personalization unit for examining the state-related context data from the analysis unit to determine whether requirements of the user, in terms of services and resources that are required, are being met and, if they are not, what action(s) needs to be taken in order to deliver the required services and/or resources to the user.

In accordance with a second aspect of the present invention, there is provided a method for creating and managing personalized services in a communication system, including:

performing pre-processing for converting vendor- and device-specific sensor data into a normalized form to produce normalized sensor data;

analyzing the normalized sensor data, determining a current state of entities being managed and producing state-related context data to thereby determine whether current services and resources that have been allocated to a user are being satisfied or not; and examining the state-related context data to determine what action to take to ensure that the context-specific services and/or resources required by the user are being supplied.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

Hereinafter, embodiments of the present invention will be described with reference to the accompanying drawings which form a part hereof.

Figure 1:
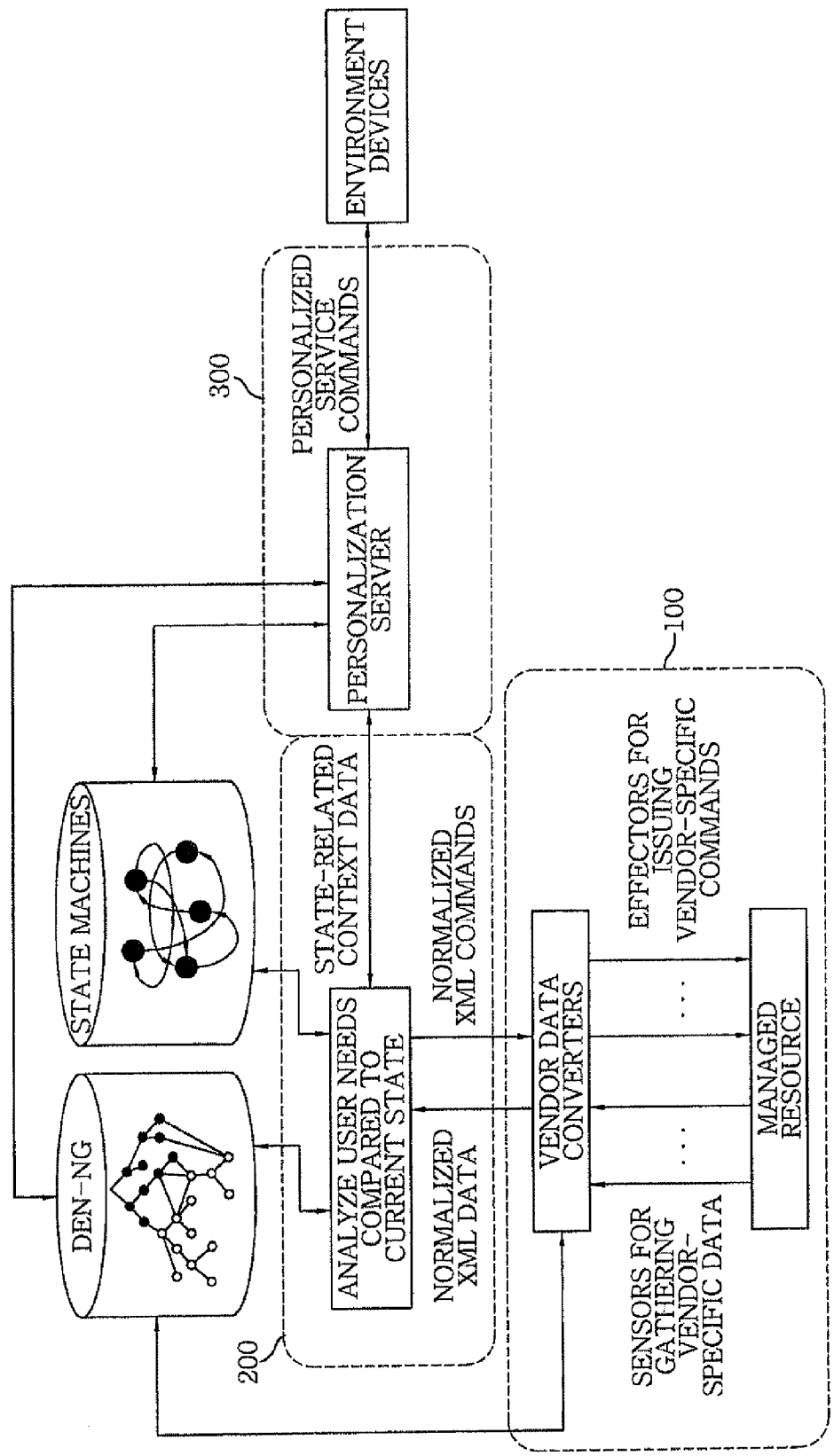
FIG. 1 illustrates a conceptual architecture showing features of an apparatus for creating and managing personalized services in accordance with an embodiment of the present invention.

FIG. 1 illustrates a conceptual architecture showing features of an apparatus for creating and managing personalized services in a communication system in accordance with an embodiment of the present invention. The apparatus includes a pre-processing unit 100, an analysis unit 200 and a personalization unit 300.

Data, especially network data, is heterogeneous in nature, and are not easy to integrate. In addition, context is made up of multiple data from multiple domains. Hence, the fundamental inability to relate different data to each other prevents current systems from determining the current context (e.g., states of entities that are part of current operational environment). There is currently no standardized mapping that exists to relate heterogeneous management and operational data to context data, making it impossible to change the resources and/or services provided when context changes in a standardized manner.

The apparatus of the present invention solves this problem in three stages, i.e., pre-processing, analysis and personalization. Due to the complexity involved in correlating heterogeneous management and operational data with context data, this invention uses policy rules to define how the combination of these data are used to provide personalized services for an end-user. Specifically, this invention enables context to select the set of policy rules to be used to analyze the heterogeneous and operational data, and to make decisions using those data.

The pre-processing unit 100 is responsible for converting vendor- and device-specific sensor data into a normalized form. Similarly, it takes normalized commands, which are independent of any specific vendor and/or device, and translates them into an equivalent vendor- and device-specific set of commands.

The analysis unit 200 determines a current state of entities being managed based on the normalized sensor data. The current state of the entities being managed is then compared to a desired state of those entities. If the current and desired states are equal, then the analysis unit 200 makes the decision to continue to monitor the normalized sensor data. However, if the two states are not equal, then the analysis unit 200 uses this information to determine whether current services and/or resources assigned to a user are threatened in any way, and defines a set of recommended actions that has to be taken to ensure that the user's services and resources are not threatened.

The personalization unit 300 receives the recommendations from the analysis unit 200 and either implements the suggested commands, proposes a new set of data to monitor, if the sensor data show that the services and/or resources allocated may be threatened, or defines a set of commands to solve the problem. The former case may be, for example, to further reinforce the conclusions of the analysis unit 200. In this latter case, the apparatus also defines a method to check if the managed entities are converging to their new state.

The above set of decisions reflects actions that should be taken as long as the context has not changed, because in this case, the policy rules that were originally selected are still valid. However, if the context has changed, then the new context will be used to select a potentially new set of policy rules that will in turn be used to determine the set of remediation actions to take.

Preprocessing Stage

There are a number of methods that can be used to perform the pre-processing in the pre-processing unit 100. An exemplary method is to use the Directory Enabled Networks-next generation (DEN-ng) model to guide a transformation process.

Figure 2:
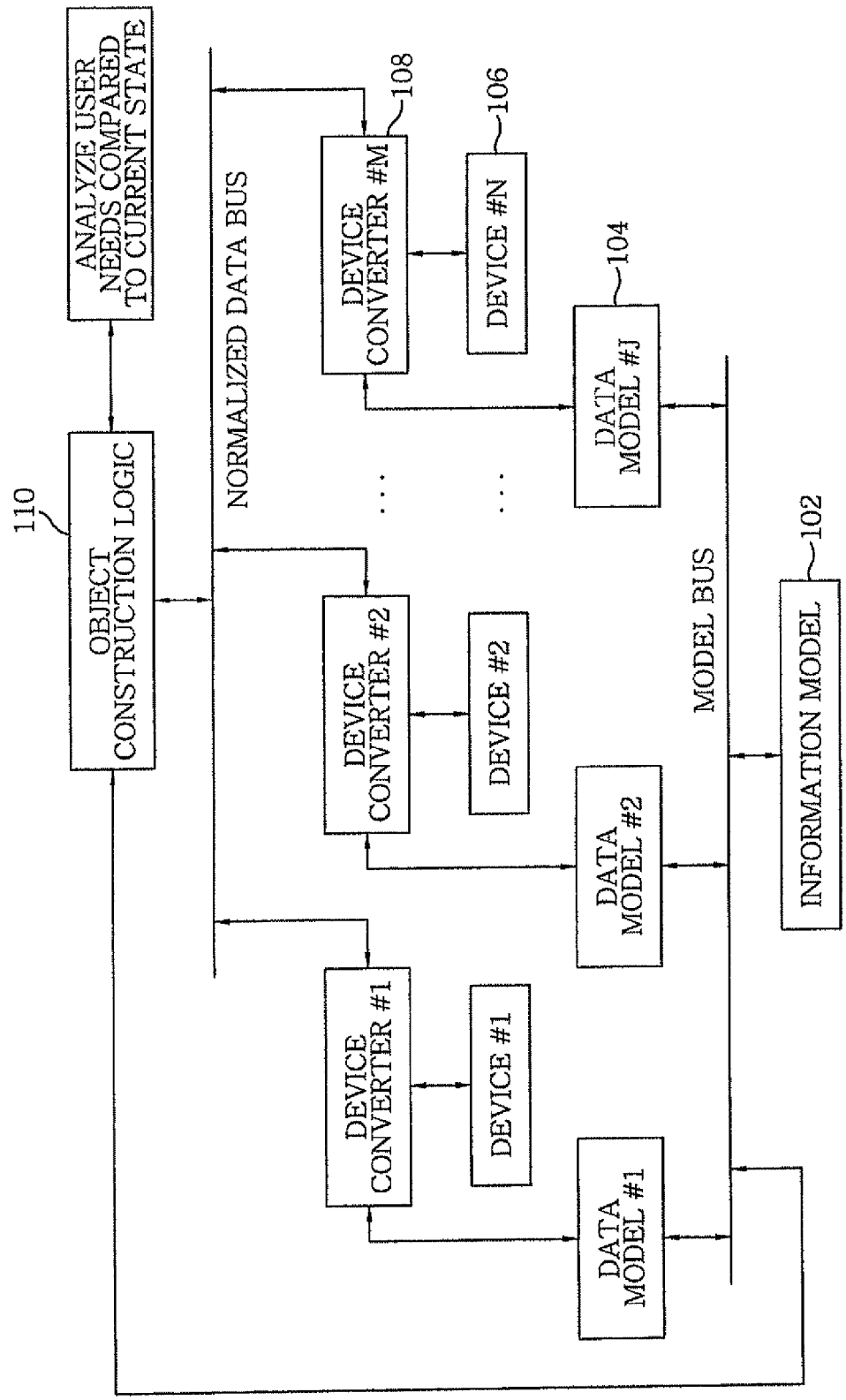
FIG. 2 illustrates a detailed view of the pre-processing unit shown in FIG. 1.

FIG. 2 shows a detailed view of the pre-processing unit 100 shown in FIG. 1. The pre-processing unit 100 includes devices 106, an information model 102, data models 104, device converters 108, and an object construction logic module 110.

The raw data generated by different sensors can be in different formats and languages. This is because each device uses its own language to describe its management data. In fact, a given device 106 can generate different data using different languages (e.g., SNMP and CLI). This is why the number of devices 106, data models 104, and device converters 108 may not be the same.

The preferred approach is based on the use of software patterns, and uses the same information model 102 for representing the key concepts of the present invention (i.e., capabilities, context, preferences, profiles, subscriptions, and users) as well as the management data from each device 106. This ensures that the device management data can be related to the concepts of the present invention. In this preferred approach, the information model 102 is used as both an analysis and runtime template. For analysis, the information model 102 describes how to use the management and operational data to design systems; for runtime management, the information model 102 is instantiated into a set of data models 104 whose objects, attributes, and relationships are then "filled in" with measured data.

The information model 102 defines knowledge in a technology-, vendor-, and device-neutral form. Conceptually, its purpose is to define the characteristics and behavior of a given managed entity, and how that managed entity relates to other entities in the environment. The data models 104 translate this high-level knowledge into a form that is specific to a given application; this typically means that a set of mappings are performed that transform the data into a form that is dependent on platform, language, and/or protocol. Each data model entity supports one or more devices 106. This is because a given device manufacturer produces many different devices that each have different versions of their management data.

The device converters 108 use a combination of structural and pattern matching to identify vendor- and device-specific data, and then translate those data to a normalized form for further processing. A preferred approach is for the normalized form to use XML (extensible markup language), as this makes the normalized form independent of the platform used. This is done in two steps. First, the information model 102 is instantiated into one or more data models 104 that represent the management and operational data produced by the devices 106 being monitored. Each data model 104 produced contains a set of objects that have attributes and relationships. The attributes of an object represent intrinsic characteristics of the object, and are defined using a set of attribute-value pairs for each managed object. For example, a device interface can be represented as a class with a set of attributes. The sensor data contains values for each of these attributes. Relationships between different objects represent dependencies and other types of associations between entities being monitored, and are used to infer features to be configured. Second, the received data is then parsed, so that the data values can be matched to the appropriate attributes. (In other words, the information model 102 is instantiated into one or more data models 104, whose objects, attributes and relationships are populated by sensor data. The advantage of this approach is that it can be used to both validate the data by measuring its conformance to the model, and to validate the model by measuring how accurately the model represents the characteristics and behavior of the entity being modeled.) Since each data model 104 is in effect a small extension to the DEN-ng object-oriented information model, software patterns can be used to provide an efficient implementation of this part of the apparatus by reusing similar concepts among the set of data models 104. Hence, the embodiment scales by using software patterns to "attach" desired data models (as required by the functionality of a given computing system) to a common information model.

The concept of capabilities can be used as a flexible template that defines the set of functions that are of interest for a particular device. This enables features such as negotiation to be orchestrated as well. For example, a device 106 may have different options for performing a specific function, such as different strengths of encryption. Such options are often buried among different features that the device 106 has. Capabilities enable a system to quickly scan the salient features of the device 106, facilitating a quick selection of whether it can support the needs of the current context. Hence, capabilities may be thought of as intelligent summaries of key functionality that a managed entity can offer.

The outputs of the device converters 108 are sent to the object construction logic module 110. The object construction logic module 110 receives the set of individual XML data produced by each of the device converters and combines them into a single cohesive model that describes the characteristics and behavior of the system being managed for a specific context. For this, the object construction logic module 110 uses a combination of the information model 102 and one or more appropriate data models 104 to determine how the different sensor data are related to context.

Figure 3:
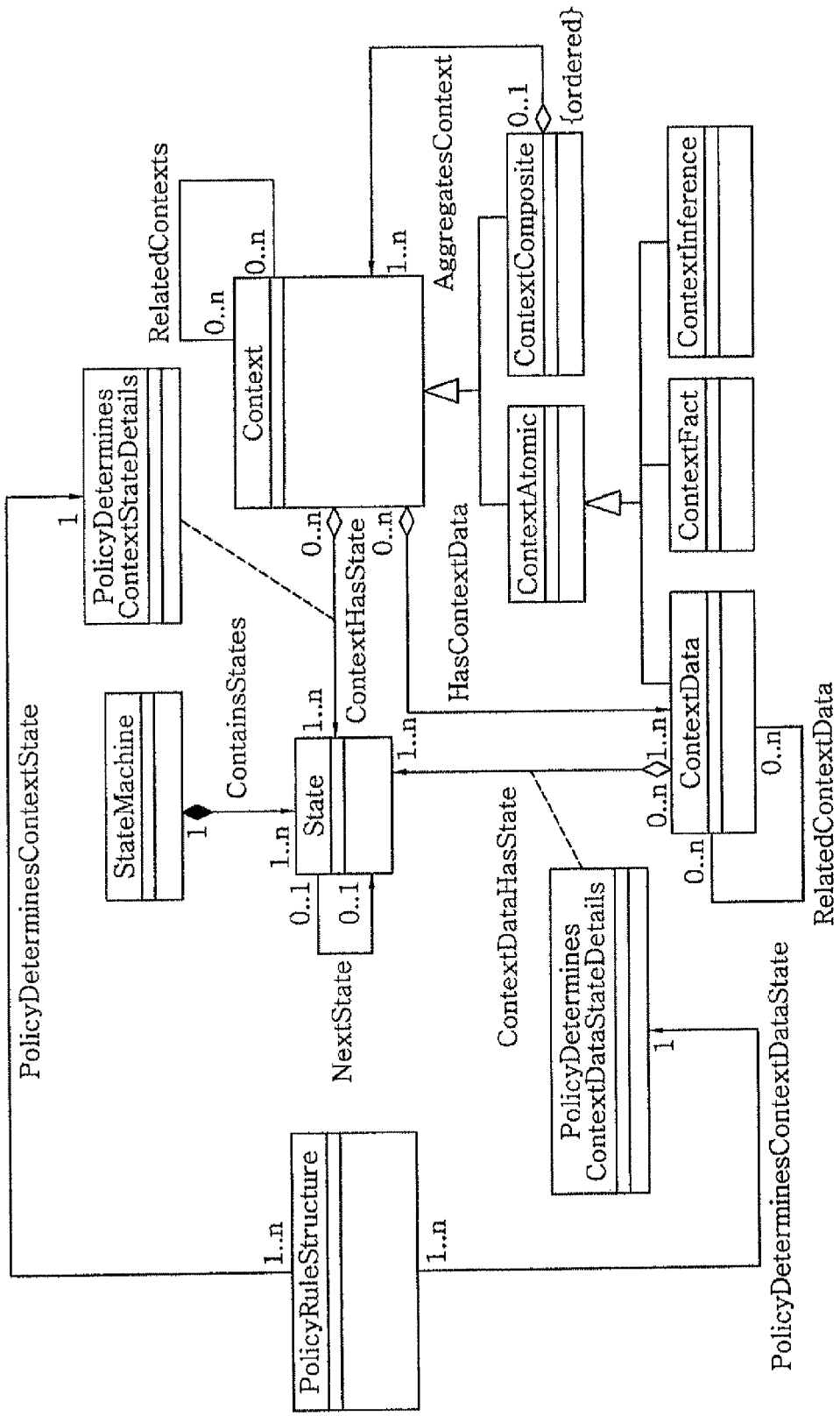
FIG. 3 shows a simplified extract of the DEN-ng Context model.

FIG. 3 shows a simplified extract of the DEN-ng Context model. The Context object models the complete context of a situation, and can be made up of a set of ContextData objects, which each represent a unique aspect of the overall context. The Context and the ContextData objects are implemented as intelligent containers, and contain metadata as well as content to describe their information. The composite pattern is used to enable hierarchies of Context and ContextData objects to be created in a consistent manner. In this approach, a ContextAtomic (or ContextDataAtomic) object represents Context (or an aspect of Context) when it can be modeled as a single, stand-alone object. In contrast, the ContextComposite (or ContextDataComposite) objects represent objects that are made up of multiple distinct Context (or ContextData) objects that can be separately managed. For example, when modeling a phone call that can involve handover between two different technologies, two different aspects of context, each consisting of a collection of ContextData object instances that is bound to a particular technology, are instantiated. This enables the phone call (which is modeled as an instance of the Context object) to be better managed, since the underlying technologies are themselves fundamentally different.

Sensor data is retrieved from the set of device converters 108, which translate vendor-specific data into a normalized form. The normalized form of each sensor data object is then analyzed to determine if it is a valid Context or ContextData object. This can be done by many methods; an embodiment uses a data model as a template, and matches the normalized data to the data contained in the template. If the normalized data does not match, it is discarded; if it does match, then it is added to the appropriate data model as a set of object instances. The set of ContextData objects are then analyzed to determine a current state of the managed entity. The analysis information is then sent to the next unit.

Analysis Stage

In the analysis unit 200, it is determined whether the contracted services and resources that were allocated to the user are being satisfied or not. Further, analyzing sensor data is also included to determine whether the contractual terms of delivering the services and resources are in danger of being violated or not.

The analysis of the sensor data is done by comparing the current state of the managed entity with its desired state. If the states are equal, then monitoring of the sensor data continues. However, if the states are not equal, then one or more actions need to be taken. Taking actions can include one or more of the following: monitor additional data to help determine where the problem is, recommend a set of configuration changes to a human administrator, and/or execute one or more configuration changes. The reason that the present invention includes all three actions is to provide the human administrator with options to customize embodiments of the present invention to suit their application-specific needs. The first case is important to provide, because many systems, such as the FOCALE autonomic architecture, will develop hypotheses to find the root cause of a problem; this option enables the system to retrieve specific data for further analysis. Regarding the second and third options, a human will most likely not trust the system to automatically reconfigure devices, especially if they perform a critical function in the network, at least until the human administrator sees that the software does not make mistakes. Alternatively, once the human administrator trusts the software, then it is important to take advantage of automatic reconfiguration, as this has many business benefits, such as reducing operational expenditures.

Personalization Stage

The purpose of the personalization unit 300 is to examine the state-related context data from the analysis unit 200 and determine what, if any, action to take. A high-level flow chart of the personalization unit 300 is shown in FIG. 4.

Figure 4:
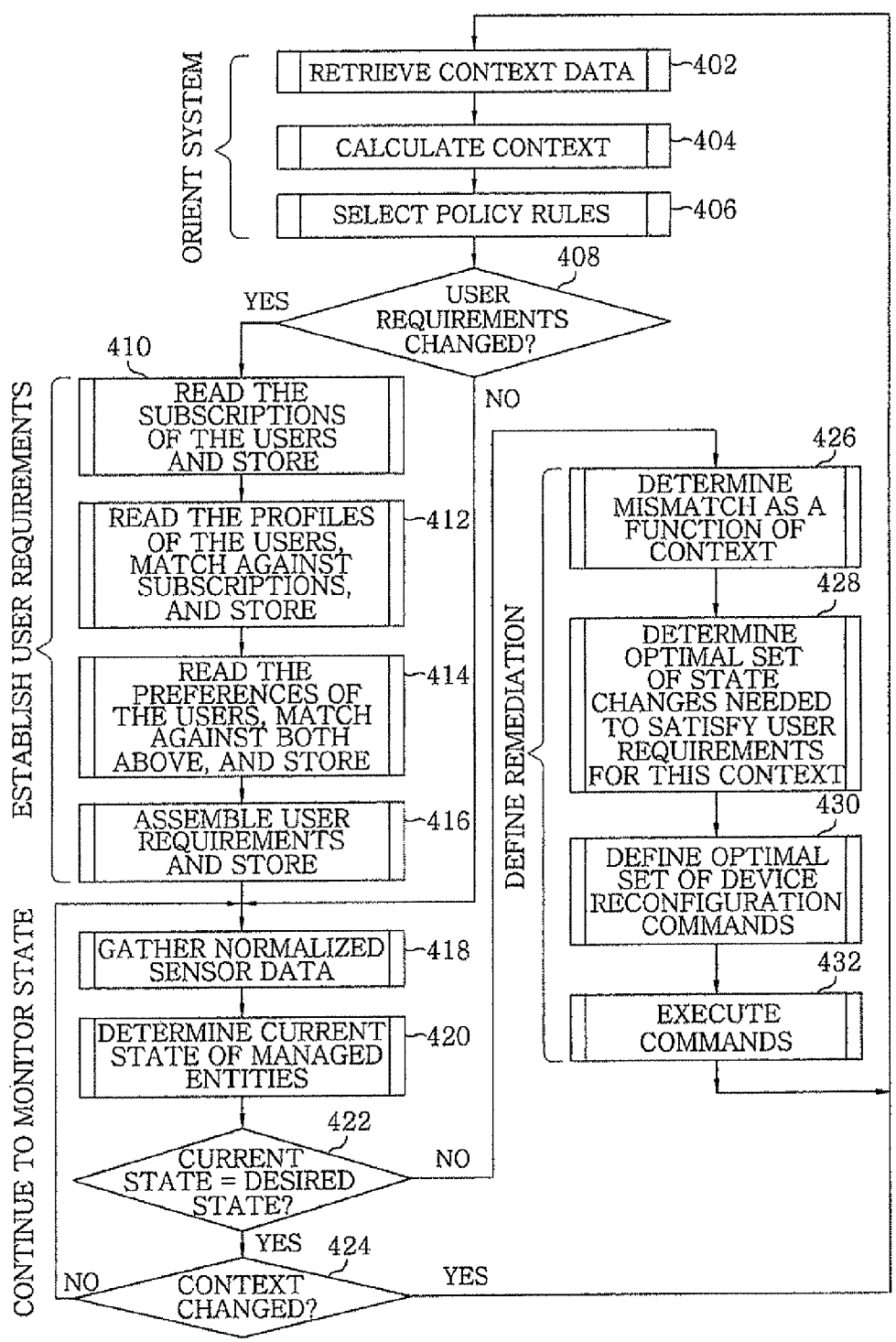
FIG. 4 illustrates a high-level flow chart of the personalization unit shown in FIG. 1.

Referring to FIG. 4, first, context data is retrieved in step 402. The retrieved context data is used to calculate the current context of the system in step 404. In general, a system can contain many policy rules, most of which will not be applicable to the current context. Hence, in step 406, the current context is used to select the subset of policy rules that are applicable to that context. These three steps orient, or ground, the system, by establishing the functionality that is permitted for this particular context.

Next, user requirements for this particular context are established. In step 408, these requirements are checked to see if they have been defined or changed. When the system is first initialized, no user requirements will have been established, so the Yes branch is taken, leading to step 410. In steps 410, 412, and 414, the user requirements, i.e., subscriptions, profiles, and preferences for a particular user or set of users are defined, respectively. In step 416, these user requirements are integrated to form a single definition of the services and resources required by the user or set of users for this particular context. This serves as a set of goals to be achieved and maintained by the system. In other words, as long as the context remains the same, the system will strive to provide the resources and/or services specified by the user requirements.

In step 418, sensor data is gathered and normalized. The embodiment will present the normalized data using XML. In step 420, a current state of the set of entities being managed is determined based on the normalized data. Step 422 then determines if the current state of the set of entities being managed is the same as its desired state. If it is, then the Yes branch of the decision is taken. This leads to step 424, where the context is checked to ensure that it has not changed. If it has not changed, then the user requirements are by definition still valid, and so the system continues to monitor the state of the entities being managed and returns to step 418. (Note that if the user requirements had changed, this would cause a change in context.)

Alternatively, if the context has changed in step 424, then the system returns to step 402, in order to re-orient the system. The new context is calculated in step 404, and a potentially new set of policy rules are calculated in step 406. Then, in step 408, the system determines if the user requirements have also changed; as previously said, this could be because the overall context has changed. If the user requirements have changed, then the Yes branch of the decision in step 408 is taken, and the flow continues to step 410, which begins the process of determining the new user requirements. Alternatively, if the user requirements have not changed, then the No branch of the decision in step 408 is taken, and the flow continues to step 418, where new sensor data is retrieved and normalized.

If the current state of the set of entities determined based on the normalized sensor data does not equal its desired state in step 422, then the system determines the mismatch between the current and desired states as a function of an active context in step 426. The embodiment will map the current and desired states onto a set of state machines. This enables an optimal set of state changes needed to satisfy the given user requirements to be determined in step 428. Next, in step 430, the system defines an optimal set of reconfiguration commands to fix the problem, as a function of context. The defined commands are executed in step 432. In the embodiment, this is done by computing an optimal set of state transitions that change the current state (which is sub-optimal) back to its optimal state. This is a graph theory problem, and can be solved by any number of existing embodiments. Control then returns to step 402.

The preceding discussion of FIG. 4 has described how this invention personalizes the services and/or resources for a set of users operating in a particular context. Step 410 of this discussion referred to user subscriptions, which have an important role to play in determining the set of services and/or resources to be provided to the user.

Subscription Management

A subscription management will be described with reference to FIGS. 5 and 6.

Figure 5:
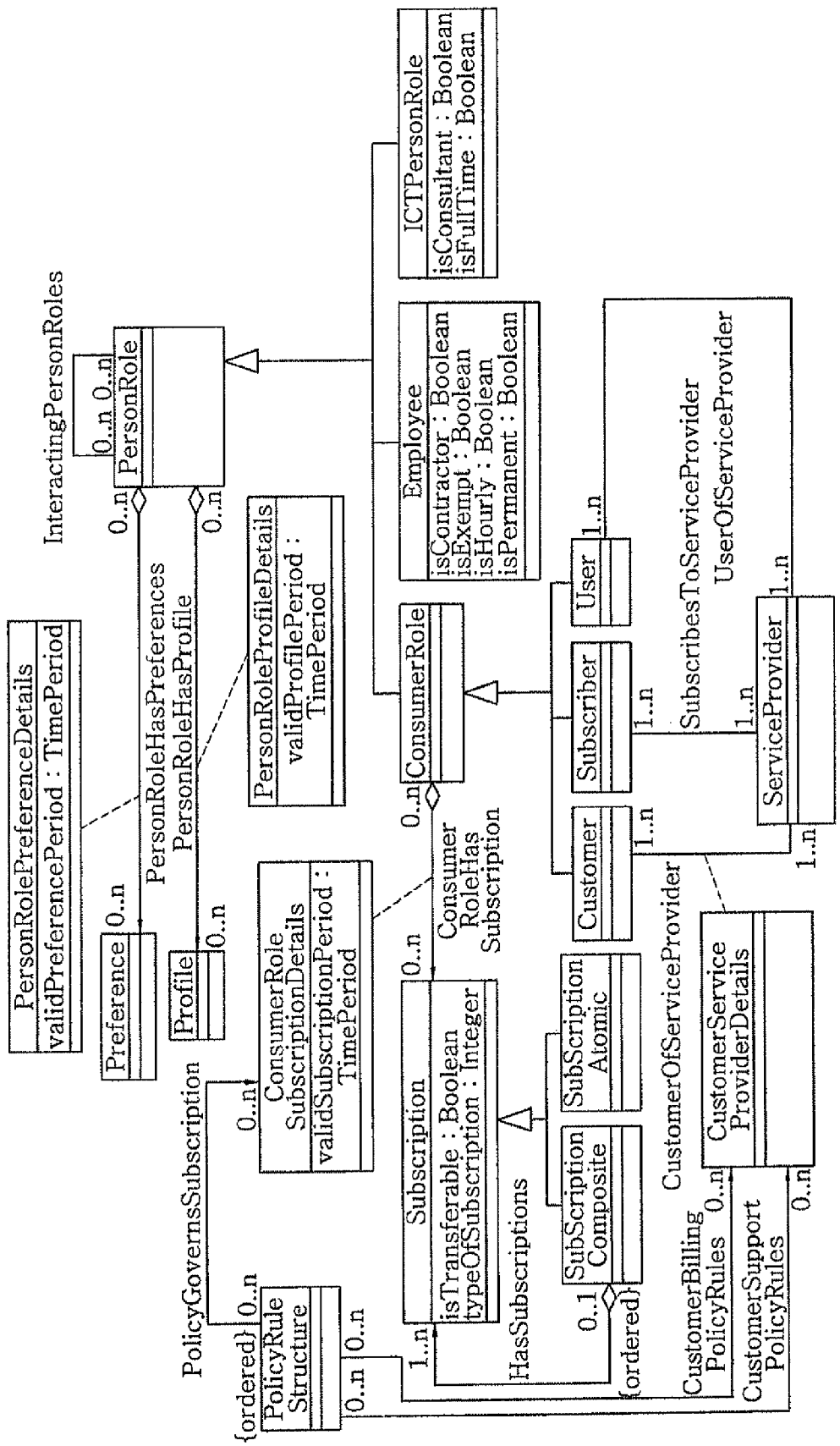
FIG. 5 shows a simplified extract of the DEN-ng Subscription model.

FIG. 5 shows a simplified extract of the DEN-ng Subscription model. In this figure, subscriptions are modeled using the composite pattern for flexibility and extensibility. SubscriptionAtomic represents a stand-alone subscription, while SubscriptionComposite represents a set of subscriptions that are aggregated together, forming a hierarchy.

The model in FIG. 5 represents three different types of end-users (Customer, Subscriber, and User) as different types of roles. The DEN-ng model uses the role-object pattern to represent the functions that an entity can take on; this separates the modeling of the entity from the modeling of the functions that an entity performs, making for a cleaner and more extensible design. In FIG. 5, a Person models just the basic characteristics and behavior of a human, so that people can be distinguished from non-human entities. A PersonRole is used to model different job functions and behavior that a Person has. A ConsumerRole models how a user consumes products, resources and/or services. The ConsumerRoleHasSubscription aggregation defines the set of Subscriptions that a given ConsumerRole has. The semantics of this aggregation are defined in the ConsumerRoleSubscriptionDetails association class.

The three subclasses of ConsumerRole all inherit this aggregation. In addition, each defines their own relationship with one or more ServiceProviders. In DEN-ng, a ServiceProvider is a role that is played by an organization that provides products, resources, and/or services. Hence, these relationships define how a Customer, Subscriber, and User interact with the ServiceProvider.

Figure 6:
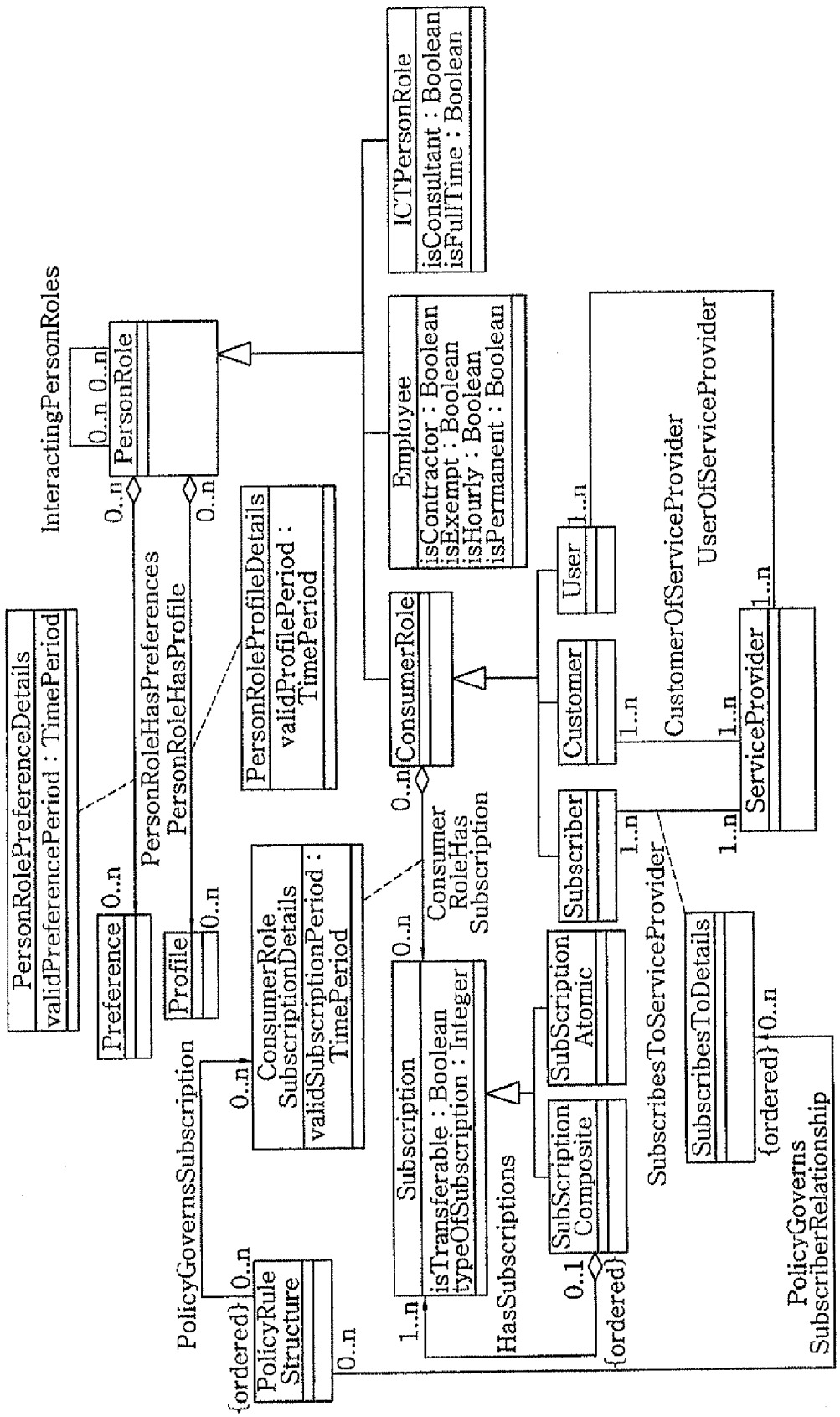
FIG. 6 shows how policy rules can be used to control and manage subscriptions.

FIG. 6 shows how policy rules can be used to control and manage subscriptions. For simplicity, only a simple example is provided. Additional relationships can be defined to suit the needs of the application in the manner described in this figure. The ConsumerRoleSubscriptionDetails association class is used to represent the semantics of a ConsumerRoleHasSubscription aggregation. As a simple example, a validSubscriptionPeriod attribute defines the starting and ending date and time of this ConsumerRole's Subscription. The set of policy rules that are used to govern a ConsumerRole's Subscription are represented by a PolicyGovernsSubscription association.

Since different policy rules are used to govern different Subscriptions of different ConsumerRoles, the method shown in FIG. 6 is used, as it relates the set of policy rules to the association class that defines the semantics of the ConsumerRole's Subscription. The semantics of how this particular ConsumerRole's Subscription are managed are controlled by the policy rules; for example, the actions of the policy rules can change the attributes of the ConsumerRoleSubscriptionDetails association class, which in turn affect the relationship between the Subscription and the ConsumerRole. Similarly, a different set of policy rules can manage the relationship between a Subscriber and the products, services, and/or resources provided to the Subscriber by the ServiceProvider by altering the attributes contained in the SubscribesToDetails association class.

For simplicity, FIG. 6 only showed these two simple examples. Additional control is also possible. For example, policy rules can manage the products, resources, and/or services of Customers and Users in the exact same way: an association class is defined for each of the CustomerOfServiceProvider and UserOfServiceProvider associations, and a set of policy rules are defined that control the attributes and behavior of those association classes. Policy rules can themselves be coordinated using meta-policies.

Profile And Preference Management

Figure 7:
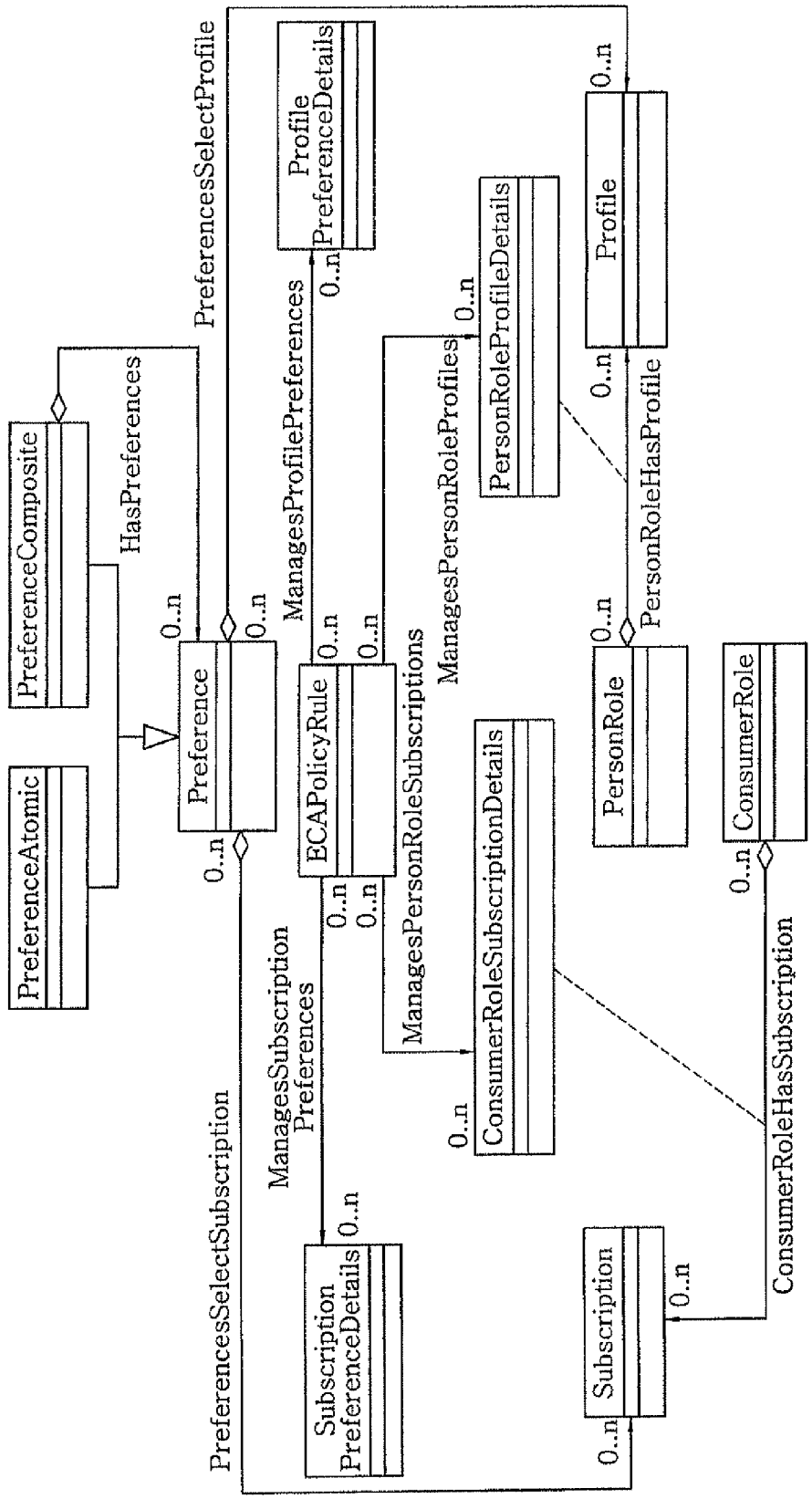
FIG. 7 shows a similar model for managing Preferences.

Next, a profile and preference management will be described with reference to FIG. 7; this corresponds to step 412 in FIG. 4.

Note that in FIG. 5 and FIG. 6, Profiles and Preferences are both related to PersonRole. FIG. 7 shows a similar model for managing Preferences. Preferences can be used to select a set of Profiles and/or a set of Subscriptions via the PreferencesSelectProfile and the PreferencesSelectSubscription aggregations. The same logic as explained in the subscription management is applied to this case, enabling a set of policy rules to manage how preferences are used to select profiles and subscriptions. This enables the set of preferences chosen by a PersonRole to in turn determine which subscriptions that person prefers, and the profile associated for each subscription.

Constraint Management

A constraint management will be described with reference to FIG. 8.

The Policy Continuum provides a means to translate policies written for one constituency in a particular grammar to a different constituency using a different grammar. This provides a convenient means for defining constraints to functionality in business terms and translating them to equivalent restrictions on the services and resources that are provided to the user.

Figure 8:
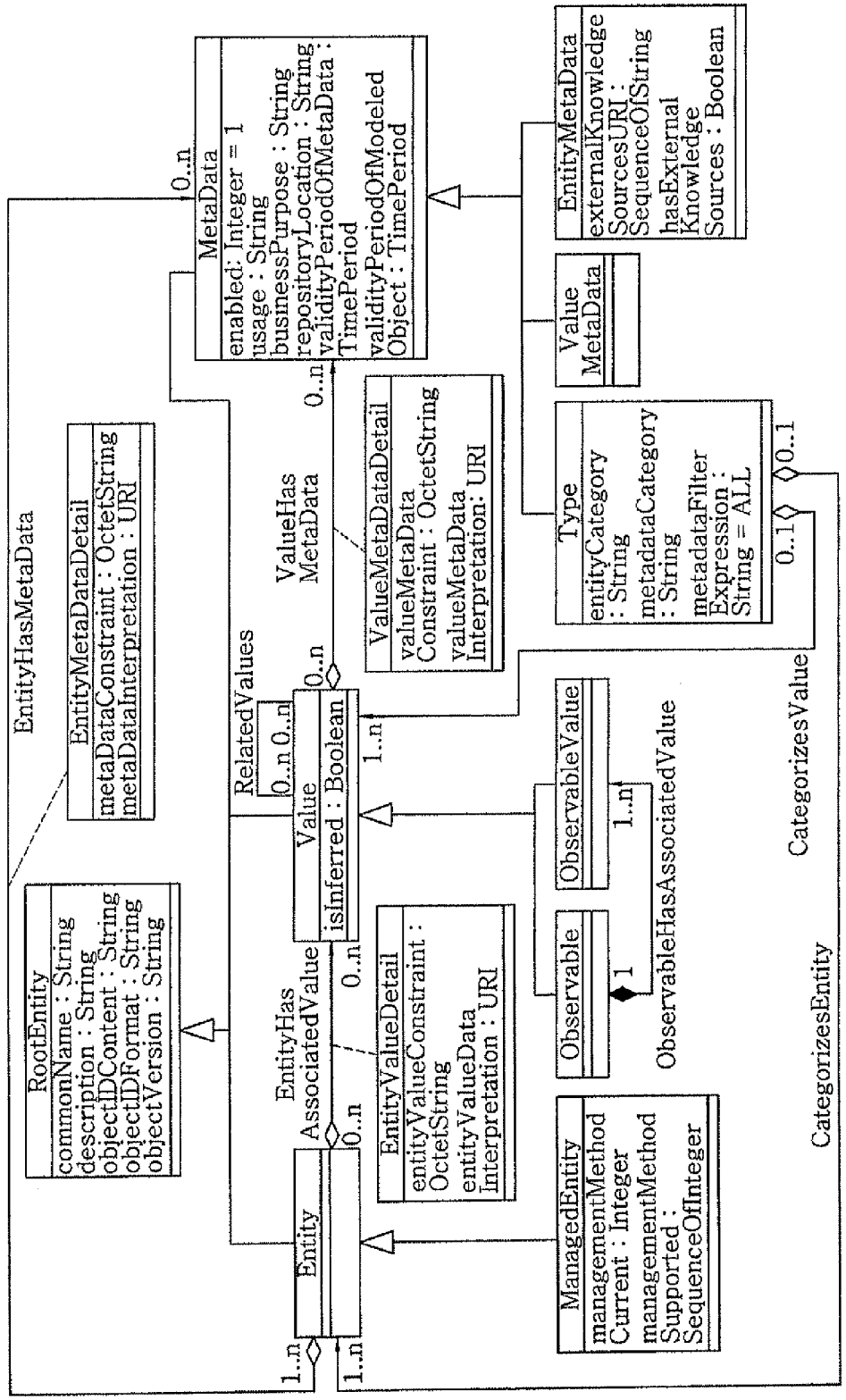
FIG. 8 shows the top-level of the DEN-ng information model.

FIG. 8 shows the top-level of the DEN-ng information model. The root of this model is the RootEntity class. It has three subclasses: Entity, Value, and MetaData. The Entity class represents objects that are important to the environment being managed that have a separate and distinct existence. Some of these may play one or more business functions, while others are required in order to represent characteristics and behavior of the entities in the environment. The Value class represents objects that are used to reify the notion of something that exists that does NOT have a distinct associated identity (like subclasses from Entity do). The MetaData class describes concepts and objects that describe how data elements or attributes are defined, and where they are physically located. Metadata may include descriptive information about the context, quality and condition, or characteristics of the data.

Constraints may be defined directly as attributes of an Entity, as instances of subclasses of the Value class, and/or as subclasses of MetaData. The first way, where the constraints are defined as attributes of an Entity is simplest, but encodes the constraint directly into the object, thereby limiting its reusability. The second way, where the constraints are defined as instances of subclasses of the Value class, along with the third way, where the constraints are defined as subclasses of MetaData, both separate the constraints from the Entity that the constraints apply to, thereby increasing the reusability of the constraints. The second way focuses on defining constraints as a specific set of objects that can be observed and/or measured, while the third way describes the constraints as a set of objects that are related to the Entity that is being constrained. The flexibility afforded by the DEN-ng model enables it to model different application-specific behavior, and is why an embodiment of the present invention uses the DEN-ng model.

The present invention uses the above capabilities of the DEN-ng model to represent constraints as applied to the modeling of personalized services. For example, the ConsumerRoleSubscriptionDetails association class, shown in FIG. 6, can be used to model constraints that are placed on the Subscription of a ConsumerRole. In FIG. 6, constraints can be embedded directly into the ConsumerRoleSubscriptionDetails class (an example of this is the validSubscriptionPeriod attribute), associated with separate Value subclasses, and/or associated with additional MetaData subclasses.

Figure 9:
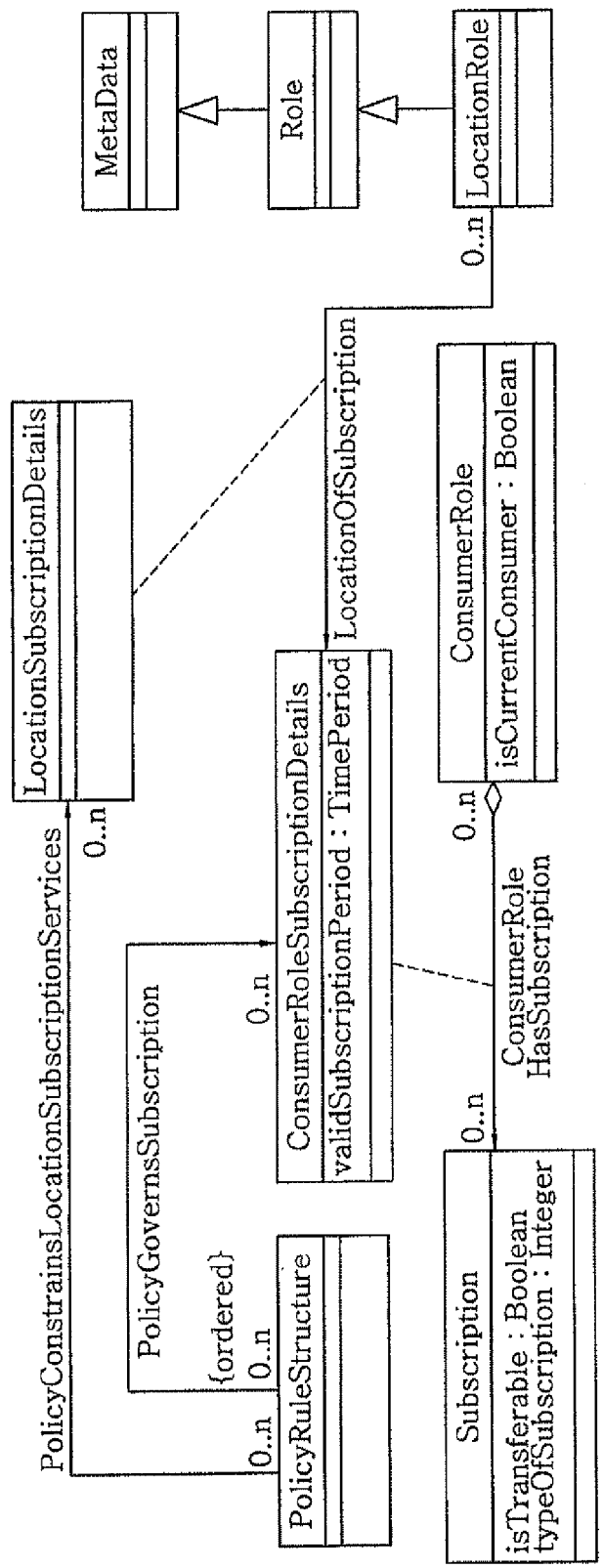
FIG. 9 shows encoding constraints as MetaData.

An example of the third approach, where constraints are defined as subclasses of MetaData, is shown in FIG. 9. FIG. 9 shows encoding constraints as MetaData. Referring to FIG. 9, the LocationSubscriptionDetails association class is used to constrain the behavior of a particular Subscription when it is associated with this specific LocationRole. For example, this enables the characteristics of the LocationRole, such as its security, to influence which Services and Resources are made available to this particular ConsumerRole. The PolicyConstrainsLocationSubscriptionServices association defines the set of Policies that are used to determine the set of constraints placed upon the Services and Resources delivered to a ConsumerRole at this particular LocationRole.

Federation Management

A federation management will be described with reference to FIGS. 10 to 12.

Figure 10:
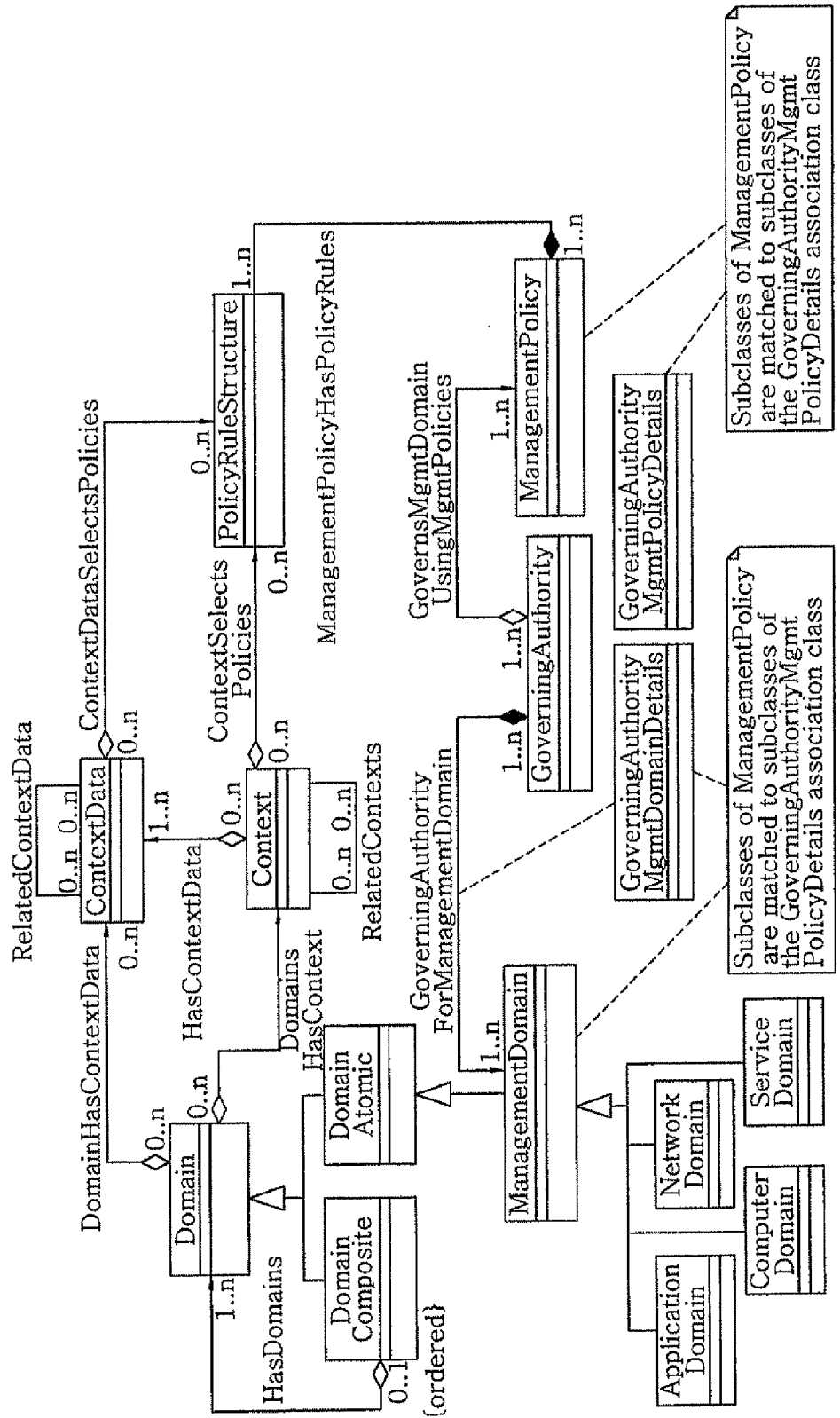
FIG. 10 shows a DEN-ng domain model.

FIG. 10 shows a DEN-ng domain model. While not explicitly mentioned in FIG. 4, the ability to federate multiple administrative domains is an important part of any scalable embodiment. The composite pattern is used to model stand-alone domains (DomainAtomic) as well as hierarchies of domains (DomainComposite). Both can aggregate a context, either as a stand-alone atomic entity (Context) or as a set of aspects (ContextData) that together make up a larger Context.

A ManagementPolicy realizes deontic actions (e.g., obligations and permissions) independent of the actual structure of the PolicyRule being used. ManagementPolicy is the superclass for PolicyRules that manage a system.

A GoverningAuthority represents an individual or collection of ManagedEntities that are responsible for performing governance operations. Note that a GoverningAuthority can be either Human or Non-Human. The ManagementDomain represents the logical collection of ManagedEntities contained a Domain, while the GoverningAuthority uses appropriate ManagementPolicies to govern both the ManagedEntities in the Domain as well as the management of the Domain itself. Note that the Domain itself is not capable of management. Management actions are performed by the GoverningAuthority, and use ManagementPolicy instances for management actions (and other types of policy rules descended from PolicyRuleStructure for other types of policy actions).

The GoverningAuthorityForManagementDomain composition defines the set of GoverningAuthorities that are responsible for managing this ManagementDomain. The GovernsMgmtDomainUsingMgmtPolicies aggregation defines the set of ManagementPolicies that are used to govern both the ManagedEntities in this particular ManagementDomain as well as the ManagementDomain itself. This is an association class, and represents the semantics of the GoverningAuthorityForMgmtDomain composition. Both of these relationships use association classes to define their semantics.

As shown in FIG. 10, a federation is defined as a set of entities that is governed by a central authority, but has a set of limited powers regarding their own local interests. The federation can use either a single centralized or a set of distributed governing authorities, along with a continuum of governance mechanisms.

Figure 11:
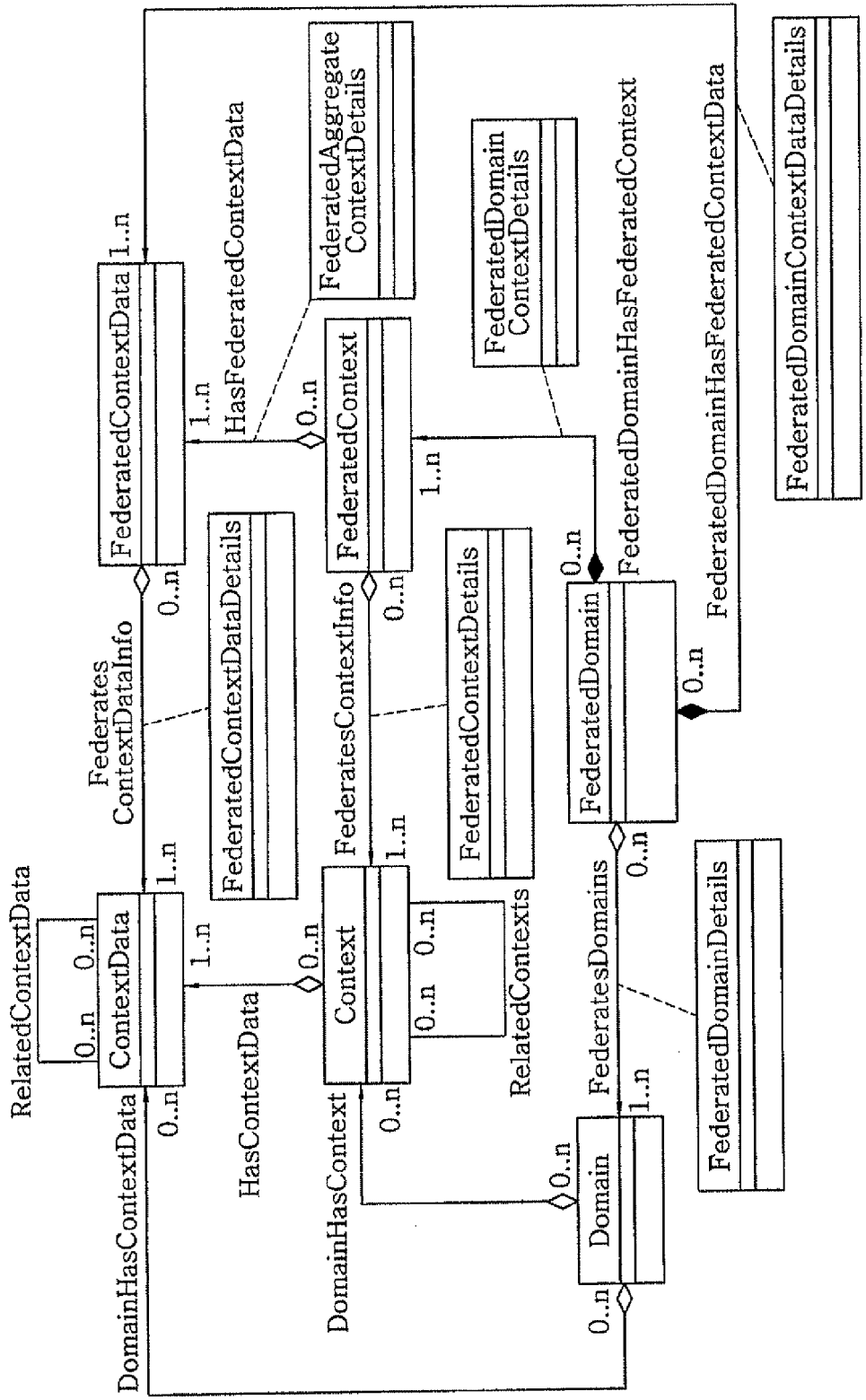
FIG. 11 shows a simplified DEN-ng federated context model.

This gives rise to a new model for federating Context, which is shown in FIG. 11. A FederatedContext represents the overall aggregate contextual information for a FederatedDomain. The FederatedContext collects local Context data from each local Domain in the Federation and then filters the contextual information according to a set of Context-Aware Policy Rules. This is realized using the FederatedContextDetails association class of the FederatesContextInfo composition, and enables privacy and other rules governing the usage of contextual information to be enforced. Similarly, a FederatedContextData represents the overall aggregate contextual information for an individual Domain in a Federation. Since each ContextData object represents a different aspect of contextual information, each ContextData object may have different visibility, access, and other rules that govern its usage. Hence, a FederatedContextData object collects local ContextData information from the local Domain in the Federation and then filters the contextual information according to a set of Context-Aware Policy Rules, This is realized using the FederatedContextDataDetails association class of the FederatesContextDataInfo composition, and enables privacy and other rules governing the usage of contextual information to be enforced.

A FederatedDomain is defined as a collection of Domains in which each Domain in the Federation agrees to use one or more global and zero or more local Policy Rules to govern the operation of the ManagedEntities that they contain. The Federation is itself a ManagedEntity, and is typically logically centralized but physically distributed. However, DEN-ng allows for logical distribution as well.

The basis of the Federation may include social, political, geographical, and/or governance mechanisms that must be applied to all constituent Domains in order to govern behavior that is of mutual interest. This is represented by appropriate Policy Rules (along with state automata to orchestrate the behavior represented by the Policy Rules). Note, however, that each constituent Domain can act autonomously in other matters that are outside the governance provisions of the Federation. In a federation, if the governance model allows for autonomous or semi-autonomous constituent Domains, then the self-governing status of those Domains cannot be altered by the FederatedDomain that contains them.

Figure 12:
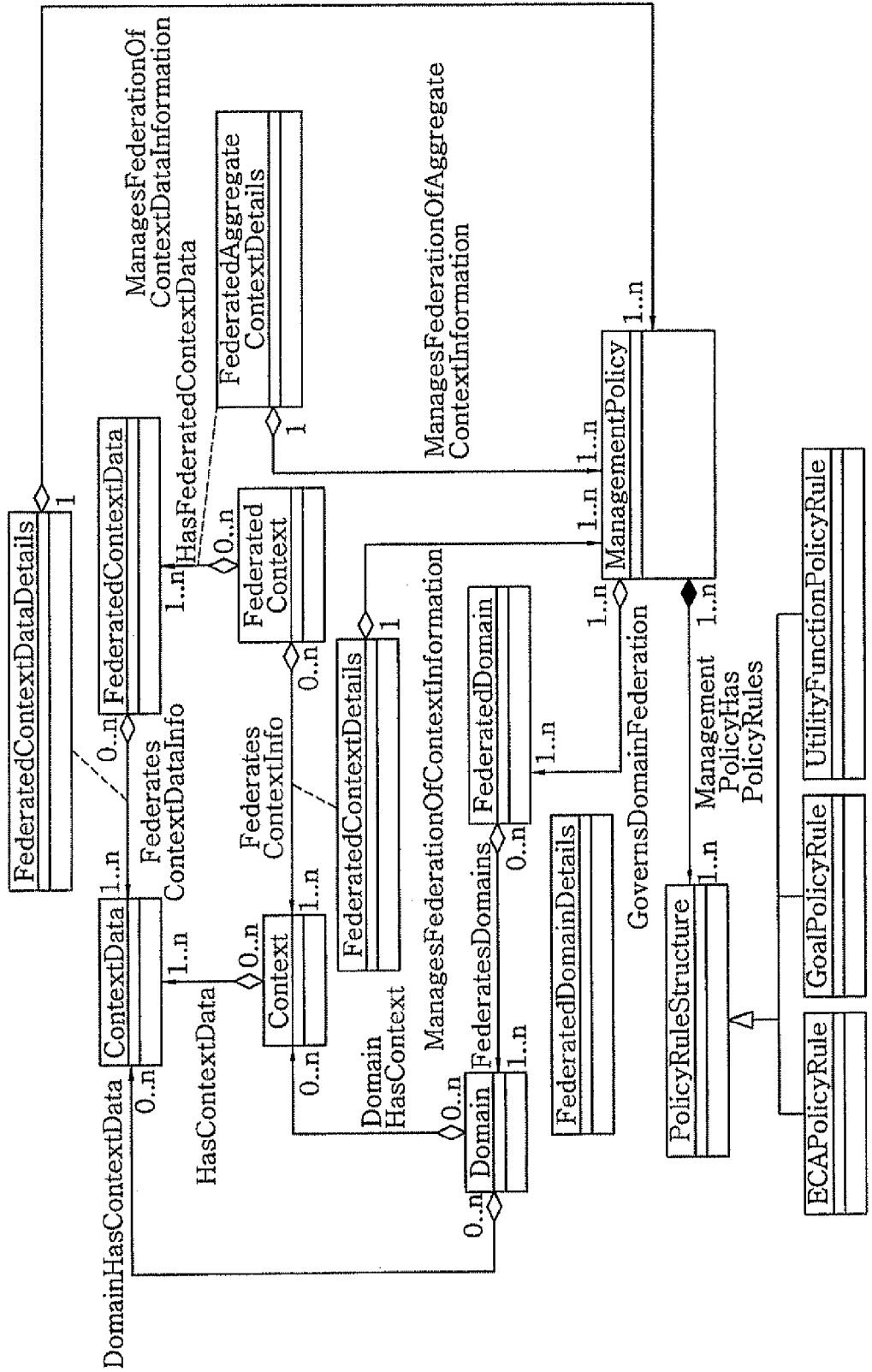
FIG. 12 shows how to apply context-aware policy rules to manage the federation of contextual information.

FIG. 12 shows how to apply context-aware policy rules to manage the federation of contextual information. Since a ManagementPolicy provides deontic rules independent of the structure of the rule, the actual policy rule content can be expressed as event-condition-action, goal, and/or utility function policy rules. Each of the three association classes (FederatedContextDataDetails, FederatedContextDetails, and FederatedAggregateContextDetails) has an aggregation between itself and ManagementPolicy, which defines the set of ManagementPolicies used to govern the attributes and behavior of each of the association classes. This indirectly governs the behavior of the composition or aggregation that each association class represents the semantics of. Hence, external applications can use the designated ManagementPolicies to govern behavior of how contextual information is federated.

Contextual Change of Device Configurations

Figure 13:
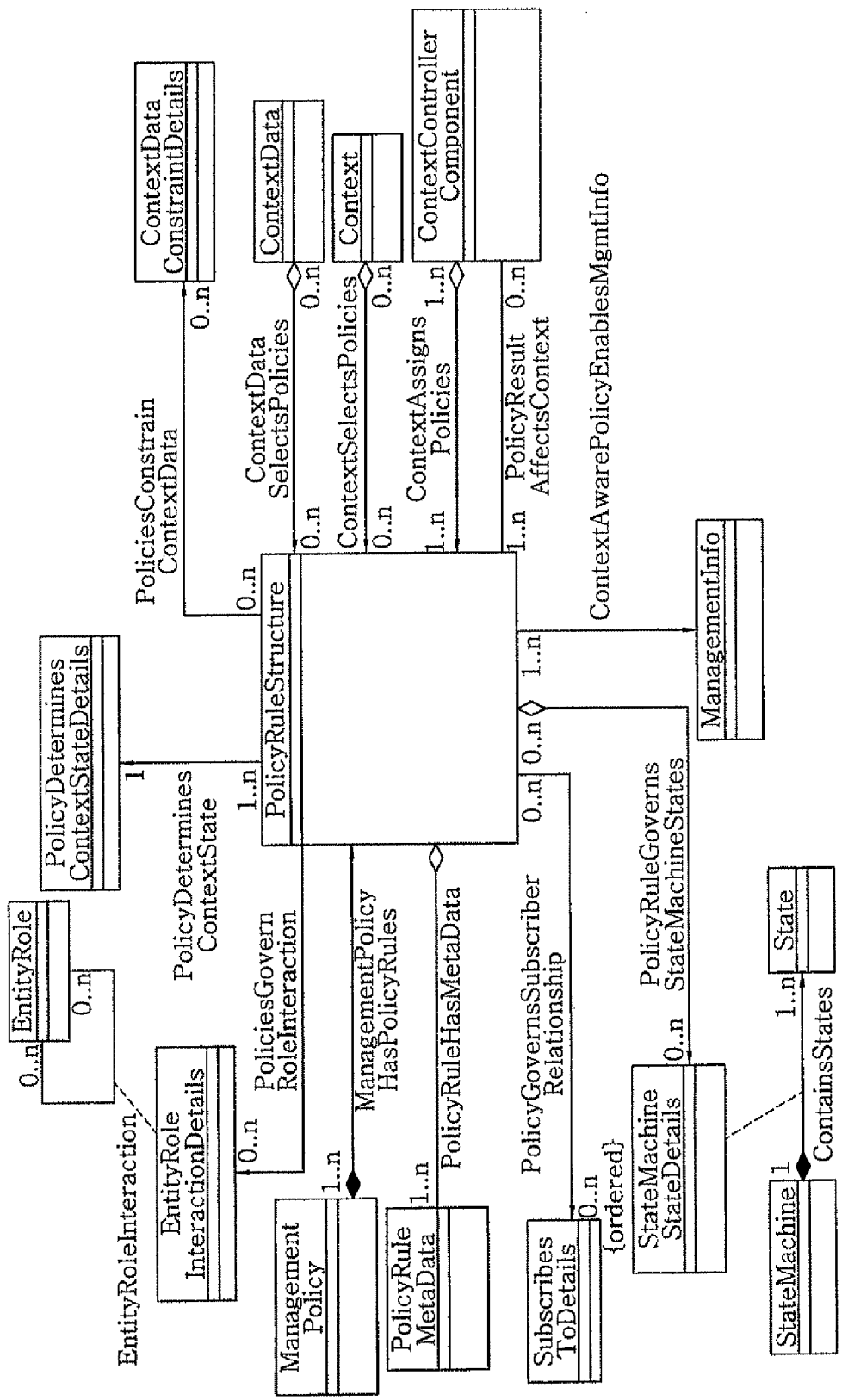
FIG. 13 shows a simplified view of the DEN-ng context-aware policy model.

FIG. 13 shows a simplified view of the DEN-ng context-aware policy model. The ContextSelectsPolicies and ContextDataSelectsPolicies aggregations define the set of policy rules that can be used for this particular Context or ContextData, respectively. PolicyRuleStructure is an abstract superclass that is the parent for different types of policy rule classes, such as event-condition-action rules, goals, and utility functions.

The PolicyDeterminesContextDataStateDetails association class defines the semantics of the ContextDataHasState aggregation. This aggregation defines the particular state that is associated with a given ContextData. The PolicyDeterminesContextDataState association defines the set of policies that control the semantics of how the state for a particular context is determined.

The set of configuration commands for a device can be viewed as a tuple that is associated with a particular state. The attributes and classes of the instantiated DEN-ng model can model an individual device command as well as a set of device commands, and hence represent the state of the managed entity. Hence, changing the set of commands for a device corresponds to changing the state of the device.

Reflecting the Changing Relevance of Contextual Data

Figure 14:
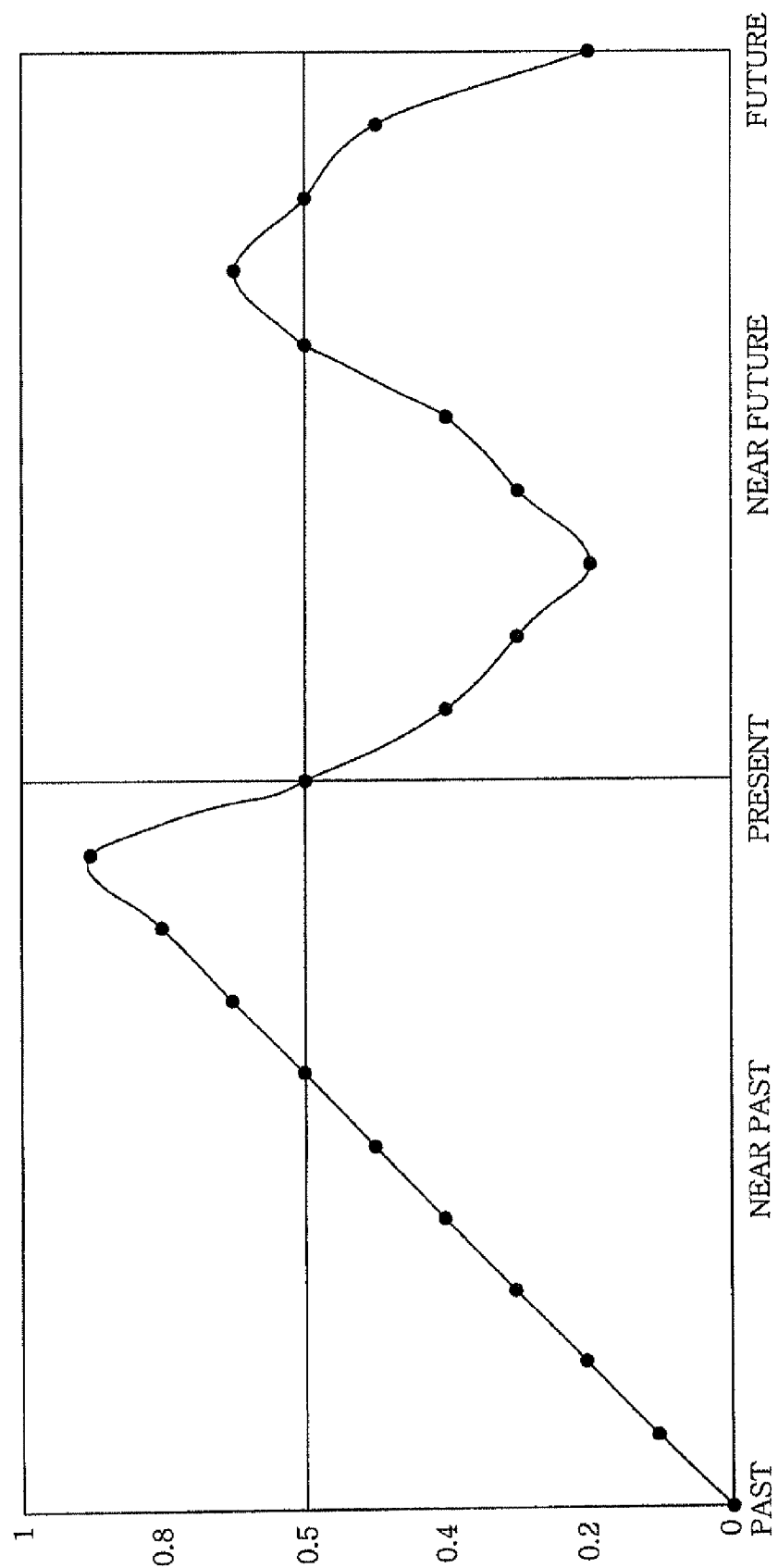
FIG. 14 shows an example of relevance function for a particular context.

Context can be conceptualized as a set of facts. The present invention models the relevance of a given fact as a function, whose value at any given point in time represents the applicability of that fact to the current context. This is encoded as metadata, since it is a measure of the relevance of a contextual datum, and not the actual content of the contextual datum. An exemplary function is shown in FIG. 14.

As described above, the present invention can be applicable to any implementation since it is not dependent on a specific technology, such as RDF.

The present invention provides extensibility and flexibility by defining separate objects and models for capabilities, profiles and preferences. Also, the DEN-ng information model is used to improve utility and extensibility of the present invention.

Further, the present invention enables different representations of data to describe the capabilities of a device, needs of the user, and desired services, thereby making it possible to smoothly manage any communication devices. And, the present invention enables changing contextual needs to be translated into a form that can reconfigure the resources and services being provided.

While the invention has been shown and described with respect to the embodiments, it will be understood by those skilled in the art that various changes and modification may be made without departing from the scope of the invention as defined in the following claims.

What is claimed is:

1. A processor-executed method for creating and managing personalized services in a communication system, comprising:
    performing pre-processing for converting vendor- and device-specific sensor data into a normalized form to produce normalized sensor data;
    the processor analyzing the normalized sensor data, determining a current state of entities being managed, and producing state-related context data to thereby determine whether current services and resources that have been allocated to a user are being satisfied or not; and
    the processor examining the state-related context data to determine what action to take to ensure that the context-specific services and/or resources required by the user are being supplied,
    wherein the processor checks whether the state-related context data indicates a change in context, and if there exists a change in context, the processor analyzes whether existing policy rules are still relevant for a changed context.

2. The method of claim 1, wherein an information model or data model is used for guiding a conversion process in said performing pre-processing step.

3. The method of claim 2, wherein the information model is used as both an analysis and runtime template.

4. The method of claim 3, wherein the information model describes how to use management and operational data to design and manage the system.

5. The method of claim 3, wherein for runtime management, the information model is instantiated into a set of data models whose objects, attributes, and relationships are then "filled in" with measured data.

6. The method of claim 5, wherein a matching of analysis to runtime data enables the runtime data to be validated by measuring its conformance to the information model.

7. The method of claim 5, wherein a matching of analysis to runtime data enables the information model to be validated by measuring how accurately the information model represents characteristics and behavior of an entity being modeled.

8. The method of claim 1, wherein in said analyzing normalized sensor data, it is also determined whether the contractual terms of delivering the services and/or resources are in danger of being violated or not for a particular context.

9. The method of claim 1, wherein whether the current services and resources that have been allocated to the user are being satisfied or not is determined by comparing the current state of the managed entities with their desired state.

10. The method of claim 9, wherein as a result of the comparison, if the current state of the managed entities is equal to the desired state, monitoring of the normalized sensor data continues, and if the current state of the managed entities is not equal to the desired state, additional actions are taken as appropriate, wherein the additional actions include defining additional data to monitor to help determine where the problem is, recommending a set of configuration changes to a human administrator, and/or executing one or more configuration changes.

11. The method of claim 1, wherein if it is determined that the existing policy rules are not relevant for the changed context anymore as a result of the analysis, new policy rules which are relevant for the changed context are computed.

12. The method of claim 1, wherein if there exists no change in context, it is checked whether requirements of the user are still satisfied, and if so, monitoring of the state-related context data continues, or if not, reconfiguration commands are computed so as to ensure that the services and/or resources required by the user are supplied.

13. The method of claim 1, wherein the personalized services are managed in accordance with changes in context.

14. The method of claim 1, wherein a set of policy rules are selected by a current context to govern management of the services and/or resources required by the user.

15. The method of claim 1, wherein a set of profiles, preferences, and subscriptions defined in an extensible object-oriented form are used to determine the services and/or resources that are to be allocated to the user as a function of a particular context.

16. The method of claim 1, wherein the context can be represented as an object-oriented set of atomic and/or composite objects.

17. The method of claim 16, wherein each contextual element can be assigned its own relevance, enabling different combinations of services and resources to be assigned to the user as the context changes.

18. The method of claim 1, wherein federations of services and/or resources can be assigned to the user as a function of a particular context.

19. The method of claim 1, wherein each of the services and/or resources that are to be provided to the user is assigned to a particular administrative domain, and each administrative domain is governed according to a set of policy rules as determined by a particular context.

* * * * *